US012160330B2

(12) United States Patent
Wang

(10) Patent No.: US 12,160,330 B2
(45) Date of Patent: Dec. 3, 2024

(54) MULTI-RATE BIDIRECTIONAL TRANSMISSION SYSTEM

(71) Applicant: NOREL SYSTEMS LIMITED, Tianjin (CN)

(72) Inventor: Yuanlong Wang, Tianjin (CN)

(73) Assignee: NOREL SYSTEMS LIMITED, Tianjin (CN)

( * ) Notice: Subject to any disclaimer, the term of this patent is extended or adjusted under 35 U.S.C. 154(b) by 21 days.

(21) Appl. No.: 18/198,335

(22) Filed: May 17, 2023

(65) Prior Publication Data
US 2023/0291616 A1 Sep. 14, 2023

Related U.S. Application Data

(63) Continuation of application No. PCT/CN2022/071736, filed on Jan. 13, 2022.

(30) Foreign Application Priority Data
Nov. 19, 2020 (CN) .......................... 202011298098.5

(51) Int. Cl.
*H04L 25/03* (2006.01)
*H04L 5/00* (2006.01)

(52) U.S. Cl.
CPC ...... *H04L 25/03006* (2013.01); *H04L 5/0048* (2013.01); *H04L 2025/0377* (2013.01); *H04L 2025/03815* (2013.01)

(58) Field of Classification Search
CPC ............ H04L 25/03006; H04L 5/0048; H04L 2025/0377; H04L 2025/03815;
(Continued)

(56) References Cited

U.S. PATENT DOCUMENTS

2010/0246647 A1* 9/2010 Maillard ............. H04L 25/0278
375/220
2019/0020511 A1 1/2019 Pillai et al.
(Continued)

FOREIGN PATENT DOCUMENTS

CN 104079859 A 10/2014
CN 109245783 A 1/2019
(Continued)

OTHER PUBLICATIONS

International Search Report, PCT/CN2022/071736, Mar. 28, 2022.

*Primary Examiner* — David S Huang
(74) *Attorney, Agent, or Firm* — Locke Lord LLP; Tim Tingkang Xia, Esq.

(57) ABSTRACT

The present invention provides a multi-rate bidirectional transmission system. A sending device and a receiving device transmit data in a bidirectional way through a cable. The multi-rate bidirectional transmission system communicates with a reverse configuration packet by sending a forward configuration packet at a preset rate in a time-division manner, selects a serial rate jointly supported by the sending device and the receiving device, and selects a training sequence length. Then, the sending device and the receiving device perform equalization training at the selected serial rate with the selected training sequence length, thus avoiding searching the serial rate and presetting the training sequence length in the worst case, thus simplifying the design and improving the link training speed.

6 Claims, 4 Drawing Sheets

(58) Field of Classification Search
CPC . H04L 5/1423; H04L 27/02; H04L 25/03146; H04L 25/4908; H04L 25/4917; H04L 25/03133; H04W 4/48; H04W 28/04; H04W 28/22; Y02D 30/50
See application file for complete search history.

(56) References Cited

U.S. PATENT DOCUMENTS

2020/0394148 A1   12/2020  Regan et al.
2021/0218544 A1*  7/2021  Choy ................ H04L 25/03146

FOREIGN PATENT DOCUMENTS

| CN | 111314252 A | 6/2020 |
|----|-------------|--------|
| CN | 112399387 A | 2/2021 |

* cited by examiner

MULTI-RATE BIDIRECTIONAL TRANSMISSION SYSTEM

CROSS-REFERENCE TO RELATED APPLICATION

This application is a continuation application of International Patent Application No. PCT/CN2022/071736, filed on Jan. 13, 2022, which itself claims priority to Chinese Patent Application No. 202011298098.5, filed in China on Nov. 19, 2020. The disclosure of each of the above applications is incorporated herein by reference in its entirety.

TECHNICAL FIELD

The present invention relates to the technical field of data transmission, in particular to multi-rate bidirectional transmission and equalization training of serial data on cables.

BACKGROUND

With the rapid development of autonomous driving and assisted driving technology, the demand for high-speed data transmission in vehicle electronic system is increasing day by day. Wired transmission technology uses cables to transmit data. Compared with wireless transmission, wired transmission is faster, more stable and has higher security, therefore it has been adopted on a large scale.

The main applications in vehicle data transmission are vehicle radar data, display video data and camera data. The image resolution of display screen and camera has experienced a rapid development stage, and now it has been upgraded from standard definition and high definition (1080P) to ultra-high definition (2K/4K). In addition, the popularity of multiple exposure technology of camera and wide color gamut technology of display screen has put forward higher requirements for data transmission speed.

In vehicle-mounted data transmission, it is required that forward data and reverse data can be transmitted on the same cable at the same time. Generally, the rate of forward data in vehicle-mounted applications is much higher than that of reverse data. For example, in camera applications, forward data is real-time high-definition or ultra-high-definition video data, and the bandwidth of forward data can reach 10 Gbps or higher, while reverse data is generally low-speed control data for programming I2C interface of a camera.

Coaxial cable and shielded twisted pair commonly used in vehicle applications can attenuate high-speed signals as high as 30 dB, and the attenuation of cables to signals is different at different frequency points, and varies with the quality and length of cables. Furthermore, the attenuation also changes with other factors besides cables in the transmission line, such as connectors and traces on PCB that may exist in the transmission line.

Therefore, vehicle-mounted wired transmission generally supports multiple transmission rates. When the cable quality is poor, the attenuation is large, and the bandwidth requirement is low, the lower transmission rate is used, while the higher transmission rate is used when the cable quality is good, the attenuation is small, and the bandwidth requirement is high.

At the same time, the receiving device of vehicle-mounted wired transmission is generally designed with an equalization circuit to compensate the attenuation of signals by cables and improve the signal quality. Commonly used equalization operations include CTLE (continuous time linear equalization), FFE (feed forward equalization), DFE (decision feedback equalization) and so on.

The adjustment of the coefficients of the equalization circuit is called an equalization training. The purpose of the equalization training is to adjust the parameters and coefficients of the equalization circuit for the attenuation curves of cables and transmission lines including cables in each specific implementation, so as to achieve the best compensation effect and improve the received signal quality.

In the prior art, in order to receive data correctly, the receiving device needs to search and try to perform equalization training at every possible transmission rate. If the training is successful at a certain transmission rate, it is considered that this transmission rate is the use rate of subsequent transmission data, and then the receiving device receives the subsequent data at this rate. It takes a long time for the receiving device to search the transmission rate and try to perform equalization training at every possible transmission rate, and the time consumption increases with the increase of the number of supported transmission rates.

In addition, the training sequence length required for equalization training is also different with different equalization operations. Under normal circumstances, a receiving device that only supports CTLE equalization operation takes much shorter time for equalization training than a receiving device that supports CTLE, FFE and DFE, and the required training sequence length is also affected by whether the serial data is NRZ or PAM-M (M is an integer greater than 2) and whether it is encoded.

In the prior art, the training sequence length is usually preset as the worst training sequence length in order to obtain the best compatibility, but the time required for equalization operation is always the longest case.

In the vehicle-mounted transmission system, the search and equalization training of transmission rate usually occurs when the system is powered on for the first time. In order to give users a good experience, the vehicle-mounted video transmission and display system has strict requirements on the delay when the system is powered on for the first time. Usually, the overall delay of a video transmission and display system is required to be less than 500 ms, and the delay allocated to the wired transmission part is only a small part of it. However, in the prior art, the search for transmission rate and the equalization training length in the worst case often cannot meet the requirements of vehicle-mounted power-on delay.

In view of the above problems in the prior art, the present invention provides a multi-rate bidirectional transmission system and a link training method thereof, which can avoid searching the transmission rate and set the training sequence length according to the shortest time required for equalization operation in concrete implementation, thereby simplifying the design and improving the link training speed, and meeting the requirements for the power-on delay of the vehicle-mounted video transmission and display system.

SUMMARY

In order to solve the problems in the prior art, the technical solution adopted by the present invention is as follows: a multi-rate bidirectional transmission system, comprising a sending device, a receiving device and a cable, wherein the sending device is connected with the receiving device through the cable, wherein, the sending device sends forward serial data to the cable,
the receiving device sends reverse serial data to the cable, and the forward serial data and reverse serial data are simultaneously transmitted on the cable.

the sending device supports one or more forward serial rates, the receiving device supports one or more forward serial rates, and at least one of the sending device and the receiving device supports multiple forward serial rates, the sending device receives and separates the reverse serial data from the cable, and performs clock and data recovery and deserialization operations, the receiving device receives and separates the forward serial data from the cable, and performs a forward equalization operation, clock and data recovery and deserialization operations; the multi-rate bidirectional transmission system uses a link training method to select a forward serial rate from one or more forward serial rates jointly supported by the sending device and the receiving device, and selects a forward training sequence length to carry out a forward equalization training, the link training method comprises two stages, namely, a configuration stage and a training stage, in the configuration stage, the sending device sends one or more forward configuration packets according to a preset forward configuration serial rate, the receiving device receives the forward configuration packets according to the preset forward configuration serial rate; the receiving device sends one or more reverse configuration packets according to a preset reverse configuration serial rate, and the sending device receives the reverse configuration packets according to the preset reverse configuration serial rate; the sending device and the receiving device communicate the forward serial rate jointly supported by both parties through the forward configuration packets and the reverse configuration packets and select a forward serial rate from one or more forward serial rates jointly supported, and the sending device and the receiving device select the forward training sequence length, in the training stage, the sending device sends a forward training sequence according to the forward serial rate and the forward training sequence length selected in the configuration stage, and the receiving device receives the forward training sequence according to the forward serial rate and the forward training sequence length selected in the configuration stage and carries out a forward equalization training, wherein the forward equalization training is to adjust a forward equalization coefficient of the forward equalization operation according to the received forward training sequence, thereby improving the quality of a forward serial signal after the forward equalization operation.

Preferably, the reverse serial rate is lower than the forward serial rate.

Preferably, the forward configuration packets and the reverse configuration packets are transmitted on the cable in a time-division manner.

Preferably, the forward configuration packets and the reverse configuration packets also have error correction or error detection codes.

Preferably, the receiving device supports one or more reverse serial rates, and the sending device supports one or more reverse serial rates; in the configuration stage of the link training method, the sending device and the receiving device also communicate the reverse serial rates supported by both parties through forward configuration packets and reverse configuration packets, and select a reverse serial rate from the one or more reverse serial rates jointly supported.

Preferably, the sending device receives and separates the reverse serial data from the cable, performs clock and data recovery and deserialization operations, and performs a reverse equalization operation; in the configuration stage of the link training method, the sending device and the receiving device also select a reverse training sequence length through the forward configuration packets and the reverse configuration packets, and perform a reverse equalization training in the training stage of the link training method, in the training stage, the receiving device sends a reverse training sequence according to the reverse training sequence length selected in the configuration stage, and the sending device receives the reverse training sequence according to the reverse training sequence length selected in the configuration stage and carries out the reverse equalization training; the reverse equalization training is to adjust a reverse equalization coefficient of the reverse equalization operation according to the received reverse training sequence, thereby improving the quality of a reverse serial signal after the reverse equalization operation.

The present invention has the following beneficial effects.

The present invention provides a multi-rate bidirectional transmission system and a link training method thereof. The present invention can send forward serial data and reverse serial data on a cable at the same time. The multi-rate bidirectional transmission system selects a forward serial rate meeting the requirements of forward transmission bandwidth from one or more supported forward serial rates, and the multi-rate bidirectional transmission system selects a reverse serial rate meeting the requirements of reverse transmission bandwidth to transmit reverse serial data. The link training method provided by the present invention consists of a configuration stage and a training stage. In the configuration stage, a sending device and a receiving device send forward configuration packets and reverse configuration packets in a time-division manner according to preset forward and reverse rates, and communicate and select forward and reverse serial rates and forward and reverse training sequence lengths between the sending device and the receiving device. In the training stage, the sending device and the receiving device send forward and reverse training sequences according to the selected forward and reverse serial rates and forward and reverse training sequence lengths and perform forward and reverse equalization training. By communicating and selecting the forward and reverse serial rates in the configuration stage, the present invention avoids searching the forward and reverse serial rates in the training stage, which can simplify the design and improve the link training speed. At the same time, in the configuration stage, it can communicate and select the forward and reverse training sequence lengths needed for equalization operation in concrete implementation, which can avoid presetting the forward and reverse training sequence lengths in the worst case, thus further improving the link training speed.

BRIEF DESCRIPTION OF DRAWINGS

The present invention will be further explained with the attached drawings and examples.

| In the figures: | |
| --- | --- |
| 1 Sending device | 2 Receiving device |
| 3 Cable | |
| 11 Forward serialization module | 12 Reverse separation module |
| 13 Reverse equalization module | 14 Reverse clock and data recovery |
| 101 Forward sending data | 102 Reverse receiving data. |
| 21 Reverse serialization module | |
| 22 Forward separation module | 23 Forward equalization module |
| 24 Forward clock and data recovery module | |
| 201 Forward received data | 202 Reverse send data. |

DESCRIPTION OF EMBODIMENTS

Next, the multi-rate bidirectional transmission system will be further explained in combination with the embodiment in the attached drawings.

Figure 1:
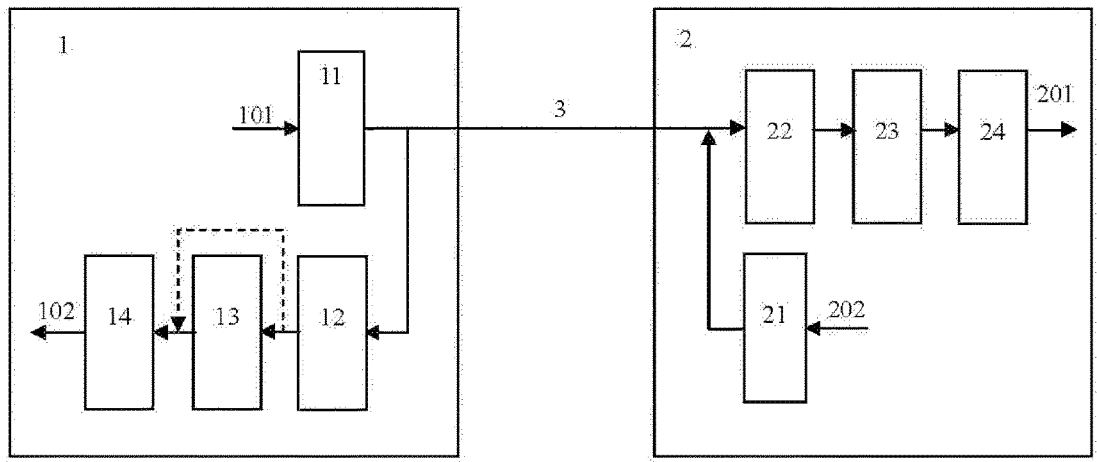
FIG. 1 is a block diagram and an application schematic diagram of an embodiment of a multi-rate bidirectional transmission system of the present invention.

As shown in FIG. 1, it is an embodiment of the multi-rate bidirectional transmission system of the present invention. In this embodiment, the multi-rate bidirectional transmission system includes a sending device 1, a receiving device 2 and a cable 3, and the sending device 1 is connected to the receiving device 2 through the cable 3.

The sending device 1 includes a forward serialization module 11, a reverse separation module 12, a reverse clock and data recovery module 14, and may further include a reverse equalization module 13.

The receiving device 2 includes a reverse serialization module 21, a forward separation module 22, a forward equalization module 23, and a forward clock and data recovery module 24.

The forward serialization module 11 is connected to the cable 3. The forward serialization module 11 receives forward transmission data 101, performs serialization operation, and generates forward serial data and drives it to the cable 3.

The reverse serialization module 21 is connected to the cable 3. The reverse serialization module 21 receives reverse transmission data 202, performs serialization operation, generates reverse serial data and drives it to the cable 3.

Forward serial data and reverse serial data can be transmitted on the cable 3 at the same time.

The forward serial data can be sent in NRZ or PAM-M mode (M is an integer greater than 2), and the forward serial data can be encoded by the forward serialization module 11, which can use codes based on random scrambling of 64b65b, 64b66b, 128b132b or other code lengths, or 8b10b, 9b10b or other DC balanced codes. The purpose of encoding is to add data flip to the forward serial data, and generate enough data transition edges to facilitate clock and data recovery and deserialization when receiving the forward serial data.

Another benefit of coding is that it can reduce the energy of forward serial data in the low frequency part of the spectrum by increasing data flips and data jumps.

The reverse serial data can be transmitted in NRZ or PAM-N mode (N is an integer greater than 2), and the reverse serialization module 21 can also encode the reverse serial data, which can use codes based on random scrambling of 64b65b, 64b66b, 128b132b or other code lengths, 8b10b codes, 9b10b codes or other DC balance codes. The purpose of encoding is to add data flip in reverse serial data and generate enough data transition edges to facilitate clock and data recovery and deserialization when receiving the reverse serial data.

In the present invention, the sending device 1 supports one or more forward serial rates, that is, the sending device 1 can send forward serial data at one or more forward serial rates through the forward serialization module 11, and the receiving device 2 supports one or more forward serial rates, that is, the receiving device 2 can receive forward serial data at one or more forward serial rates, and at least one of the sending device 1 and the receiving device 2 supports multiple forward serial rates.

The multi-rate bidirectional transmission system selects one forward serial rate from one or more forward serial rates jointly supported by the sending device 1 and the receiving device 2 through a link training method to send and receive forward serial data. The forward serialization module 11 included in the sending device 1 sends forward serial data at the selected forward serial rate, and the forward clock and data recovery module 24 included in the receiving device 2 recovers clock and data at the selected forward serial rate. Other modules included in the receiving device 2 depend on the forward serial rate and need to be set to the selected forward serial rate.

In the present invention, the receiving device 2 supports one or more reverse serial rates, that is, the receiving device 2 can send reverse serial data at one or more reverse serial rates through the reverse serialization module 21, and the sending device 1 supports one or more reverse serial rates, that is, the sending device 1 can receive reverse serial data at one or more reverse serial rates. The multi-rate bidirectional transmission system selects one reverse serial rate from one or more reverse serial rates jointly supported by the sending device 1 and the receiving device 2 to send and receive the reverse serial data. The reverse serialization module 21 included in the receiving device 2 sends the reverse serial data at the selected reverse serial rate, and the reverse clock and data recovery module 14 included in the sending device 1 recovers the clock and data at the selected reverse serial rate. Other modules included in the sending device 1 depend on the reverse serial rate and need to be set to the selected reverse serial rate.

For the same serial data, the higher serial rate contains more high-frequency energy, because the cable 3 attenuates the high-frequency energy more than the low-frequency energy, so the serial data sent at the higher serial rate attenuates more after passing through the cable 3. If the same serial data is sent at two different serial rates, the signal with high serial rate will be attenuated more, and the transmission distance is lower than that with low serial rate.

The multi-rate bidirectional transmission system of the present invention can select a forward serial rate meeting the transmission bandwidth requirement from one or more forward serial rates jointly supported by the sending device 1 and the receiving device 2 according to the transmission bandwidth required for forward transmission of data 101. If there are multiple forward serial rates meeting the transmission bandwidth requirement for forward transmission of data 101, the lower forward serial rate can be selected, but not limited to it, so as to reduce signal attenuation and increase transmission distance.

After the forward serial data is encoded, the energy of the forward serial data can be reduced in the low frequency part of the spectrum because of the increase of the flip and data jump of the serial data.

As shown in FIG. 1, the receiving device 2 includes a forward separation module 22 connected to the cable 3. The forward separation module 22 receives forward serial data and reverse serial data simultaneously transmitted on the cable 3, and separates the forward serial data and outputs it to a forward equalization module 23.

In the present invention, the reverse serial rate is lower than the forward serial rate.

An application scenario of the present invention is that the present invention is used for transmitting video signals. In this application scenario, the forward direction is used for transmitting high-speed video stream data, and the reverse direction is used for transmitting low-speed control information.

Since the reverse serial rate is lower than the forward serial rate, the energy of the reverse serial data is in the low frequency part of the frequency spectrum, and the encoded low frequency energy of the forward serial data is reduced. When the main part of the energy of the forward serial data and the main part of the energy of the reverse serial data are staggered or mostly staggered in the frequency spectrum, the circuit of the forward separation module 22 can be simplified. For example, it can help to separate the forward serial data and the reverse serial data which are simultaneously transmitted from the cable 3 through common high-pass filtering. The forward separation module 22 can also use other circuits to separate forward serial data, and other commonly used separation circuits include an echo cancellation circuit based on ADC (analog to digital converter) and the like.

The forward equalization module 23 receives the forward serial data separated from the forward separation module 22 and performs the forward equalization operation. The forward equalization function is to compensate the attenuation of the forward serial signal in the transmission route including the cable 3, improve the signal quality, and facilitate the subsequent forward clock and data recovery (CDR) and deserialization operation.

The forward equalization operation used in the present invention may be CTLE (continuous time linear equalization), FFE (feed forward equalization), DFE (decision feedback equalization) or other equalization operations.

The function of the forward equalization module 23 is to compensate the attenuation of the forward serial signal in the transmission route including the cable 3, but the attenuation of the forward serial signal by the transmission route including the cable 3 is not known to the receiving device 2, and the attenuation itself may be different at different frequency points, and changes with the quality and length of the cable 3. Further, the attenuation also changes with other factors in the transmission route besides the cable 3, such as possible connectors and traces on the PCB.

In CTLE, different attenuation curves can be achieved by adjusting the position of zero and the pole. FFE is generally implemented as a digital filter, which can have multiple taps, and the attenuation curves can be adjusted by adjusting the coefficients of each tap. DFE also has multiple taps, and the compensation for signal attenuation can be adjusted by adjusting the coefficients of each tap.

Adjustment for zero and pole of CTLE, adjustment of tap coefficients of FFE and adjustment of tap coefficients of DFE can be completed according to the equalization algorithm. Based on the equalization algorithm, the forward equalization module 23 conducts forward equalization training for the cable 3 in a specific application and the transmission route of the specific application including the cable 3, and adjusts the forward equalization coefficients of the forward equalization operation according to the received forward serial data, that is, the zero and pole of CTLE and the tap coefficients of FFE and DFE are calculated and adjusted, so as to improve the quality of the forward serial signal equalized by the forward equalization module 23, and facilitate the subsequent forward clock and data recovery and deserialization operations by the forward clock and data recovery module 24.

The equalization algorithm in the present invention may be a commonly used equalization algorithm based on Least Mean Square (LMS and SS-LMS) or an equalization algorithm based on Zero Forcing (ZF), and other equalization algorithms may also be used in the present invention. When the equalization algorithm calculates and adjusts the zero and pole of CTLE and the tap coefficients of FFE and DFE, the forward serial data to be received meets specific requirements. For example, the equalization algorithm based on Least Mean Square (LMS and SS-LMS) requires the forward serial data to be random data, so as to achieve the best effect. Therefore, when the forward equalization module 23 performs forward equalization training, the forward serial data required by the equalization algorithm should be sent by the forward serialization module 11, and the forward serial data sent by the forward serialization module 11 for the forward equalization training of the forward equalization module 23 is called a forward training sequence.

The forward equalization module 23 equalizes the forward serial data and sends it to the forward clock and data recovery module 24. The forward clock and data recovery module 24 performs clock and data recovery (CDR) and deserialization operations, and outputs the forward received data 201.

The forward equalization module 23 can selectively implement one or more forward equalization operations, and the forward equalization operations implemented by the forward equalization module 23 are not limited to CTLE, FFE and DFE described above. The forward equalization module 23 can also realize other equalization operations.

In the embodiment shown in FIG. 1, the forward separation module 22 receives the forward serial data and the reverse serial data simultaneously transmitted on the cable 3, and separates the forward serial data and outputs it to the forward equalization module 23, which equalizes the forward serial data to compensate the attenuation of the forward serial signal in the transmission route including the cable 3, so that the quality of the forward serial signal equalized by the forward equalization module 23 is improved. The forward clock and data recovery module 24 receives the forward serial data equalized by the forward equalization module 23, performs forward clock and data recovery and deserialization operations, and outputs the forward received data 201.

The forward serial data separation, equalization, forward clock and data recovery and deserialization functions in the present invention are respectively realized by the forward separation module 22, the forward equalization module 23 and the forward clock and data recovery module 24 in the embodiment shown in FIG. 1. The implementation of forward serial data separation, equalization, forward clock and data recovery and deserialization in the present invention is not limited to the implementation of the embodiment shown in FIG. 1, but can also be accomplished in other implementations. For example, DFE equalization operation and forward clock and data recovery function can often be included in the same circuit loop. Other implementations of forward serial data separation, equalization, forward clock and data recovery and deserialization also belong to the protection scope of the present invention.

The multi-rate bidirectional transmission system of the present invention can select a reverse serial rate meeting the transmission bandwidth requirement from one or more reverse serial rates jointly supported by the sending device 1 and the receiving device 2 according to the transmission bandwidth required for reverse transmission of the data 202. If there are multiple reverse serial rates meeting the transmission bandwidth requirement for reverse transmission of the data 202, the lower reverse serial rate can be selected, but not limited to it, so as to reduce signal attenuation and increase transmission distance.

As shown in FIG. 1, the sending device 1 includes a reverse separation module 12 connected to the cable 3. The reverse separation module 12 receives the forward serial data and the reverse serial data simultaneously transmitted on the cable 3, and separates the reverse serial data.

The sending device 1 may include a reverse equalization module 13. When the sending device 1 includes the reverse equalization module 13, as shown in FIG. 1, the dotted line in the sending device 1 is not connected. The reverse separation module 12 outputs the separated reverse serial data to the reverse equalization module 13, which equalizes the reverse serial signal to improve the signal quality and outputs the equalized reverse serial signal to the reverse clock and data recovery module 14.

The sending device 1 may not include the reverse equalization module 13. When the sending device 1 does not include the reverse equalization module 13, the reverse separation module 12 outputs the separated reverse serial data to the reverse clock and data recovery module 14, as shown in the dotted line connection in the sending device 1 in FIG. 1.

The reverse clock and data recovery module 14 performs clock and data recovery or CDR and deserialization operations, and outputs the reverse received data 102.

In the present invention, the reverse serial rate is lower than the forward serial rate. When the reverse serial rate is low, the transmission route including the cable 3 has little attenuation on the reverse serial signal and little influence on the quality of the reverse serial signal, so it is possible to choose not to include the reverse equalization module 13 in the sending device 1, thereby simplifying the circuit.

In the present invention, the reverse serial rate is lower than the forward serial rate, and the energy of the reverse serial data is in the low frequency part of the frequency spectrum, and the encoded low frequency energy of the forward serial data is reduced. When the main part of the energy of the forward serial data and the main part of the energy of the reverse serial data are staggered or mostly staggered in the frequency spectrum, the circuit of the reverse separation module 12 can be simplified, for example, it can help to separate the forward serial data and the reverse serial data which are simultaneously transmitted on the cable 3 through common low-pass filtering. The reverse separation module 12 can also use other circuits to separate reverse serial data, and other commonly used separation circuits include an echo cancellation circuit based on ADC (analog to digital converter).

The reverse equalization module 13 receives the reverse serial data separated from the reverse separation module 12, and performs reverse equalization operation. The function of reverse equalization is to compensate the attenuation of the reverse serial signal in the transmission route including the cable 3, which is convenient for subsequent reverse clock and data recovery (CDR) and deserialization operation.

The reverse equalization operation used by the reverse equalization module 13 may be CTLE (continuous time linear equalization), FFE (feed forward equalization), DFE (decision feedback equalization) or other equalization operations.

The function of the reverse equalization module 13 is to compensate the attenuation of the reverse serial signal in the transmission route including the cable 3, but the attenuation of the reverse serial signal by the transmission route including the cable 3 is not known to the sending device 1, and the attenuation itself may be different at different frequency points, and changes with the quality and length of the cable 3. Further, the attenuation also changes with other factors in the transmission route besides the cable 3, such as possible connectors and traces on the PCB.

The principles and equalization algorithms of CTLE (continuous time linear equalization), FFE (feed forward equalization) and DFE (decision feedback equalization) in the reverse equalization module 13 are the same as those in the forward equalization module 23, and will not be repeated here.

Based on the equalization algorithm, the reverse equalization module 13 conducts reverse equalization training according to the received reverse serial data for the cable 3 in a specific application and the transmission route of the specific application including the cable 3, and adjusts the reverse equalization coefficient of the reverse equalization operation, that is, calculates and adjusts the zero and pole of CTLE and the tap coefficients of FFE and DFE, so as to improve the quality of the reverse serial signal equalized by the reverse equalization module 13 and facilitate the reverse clock and data recovery and deserialization operation by the reverse clock and data recovery module 14.

When the reverse equalization module 13 performs reverse equalization training, the reverse serialization module 21 should send the reverse serial data required by the equalization algorithm, and the reverse serial data sent by the reverse serialization module 21 for the reverse equalization training by the reverse equalization module 13 is called the reverse training sequence.

The reverse equalization module 13 can selectively implement one or more reverse equalization operations, and the reverse equalization operations implemented by the reverse equalization module 13 are not limited to CTLE, FFE and DFE described above. The reverse equalization module 13 can also realize other equalization operations.

The functions of reverse serial data separation, equalization, reverse clock and data recovery and deserialization in the present invention are respectively realized by the reverse separation module 12, the reverse equalization module 13 and the reverse clock and data recovery module 14 in the embodiment shown in FIG. 1. The implementation of the reverse serial data separation, equalization, reverse clock and data recovery and deserialization functions in the present invention is not limited to the implementation of the embodiment shown in FIG. 1, but can also be accomplished in other implementations. For example, DFE equalization operation and reverse clock and data recovery function can often be included in a circuit loop to complete together. Other implementations of reverse serial data separation, equalization, reverse clock and data recovery and deserialization also belong to the protection scope of the present invention.

The receiving device 2 needs to receive at the same rate as the forward serial rate transmitted by the sending device 1 in order to perform correct forward equalization training and forward serial data reception. However, the sending device 1 needs to receive at the same rate as the reverse serial rate sent by the receiving device 2 in order to carry out correct reverse equalization training and reverse serial data reception.

In the prior art, in order to correctly receive the forward serial rate sent by the sending device 1, the receiving device 2 needs to search and try to perform forward equalization training at every forward serial rate that the sending device 1 may send. If the training is successful at a certain forward serial rate, it is considered that this forward serial rate is the forward serial rate that the sending device 1 chooses to use, and then the receiving device 2 receives the subsequent forward serial data at this rate. The above-mentioned process that the receiving device 2 searches for every forward serial rate that the sending device 1 may transmit takes a long time, and the time consumption increases with the increase of the number of various forward serial rates supported by the sending device 1.

Furthermore, the length of the forward training sequence required for forward equalization training varies with the different forward equalization operations. Under normal circumstances, a receiving device 2 that only supports CTLE equalization operation takes shorter time to perform forward equalization training than a receiving device 2 that supports CTLE, FFE and DFE equalization operations, and the required forward training sequence length, It is also influenced by whether the forward serial data is sent in NRZ or PAM-M mode (M is an integer greater than 2), and the required length of the forward training sequence is also influenced by the coding selection of the forward serial data, that is, whether the forward serial data has been coded based on random scrambling codes with code lengths of 64b65b, 64b66b, 128b132b or other code lengths, or has been coded with 8b10b, 9b10b or other DC balance codes, it will also affect the required forward training.

In the prior art, the length of the forward training sequence is usually preset as the training sequence length in the worst case, so as to obtain the best compatibility between the sending device 1 and the receiving device 2, but the time required for the forward equalization training is always the longest case, What has been described above is the problem that it takes a long time to perform forward serial rate search and forward equalization training in the prior art. If the receiving device 2 also transmits multiple reverse serial rates, or the sending device 1 also performs reverse equalization training, there is also the problem that the reverse serial rate search and reverse equalization training take a long time.

The link training method used in the multi-rate bidirectional transmission system of the present invention (hereinafter referred to as the link training method) can select forward and reverse serial rates in a short time, and send forward training sequences and reverse training sequences for forward equalization training and reverse equalization training.

The link training method includes two stages, a configuration stage and a training stage.

Figure 2:
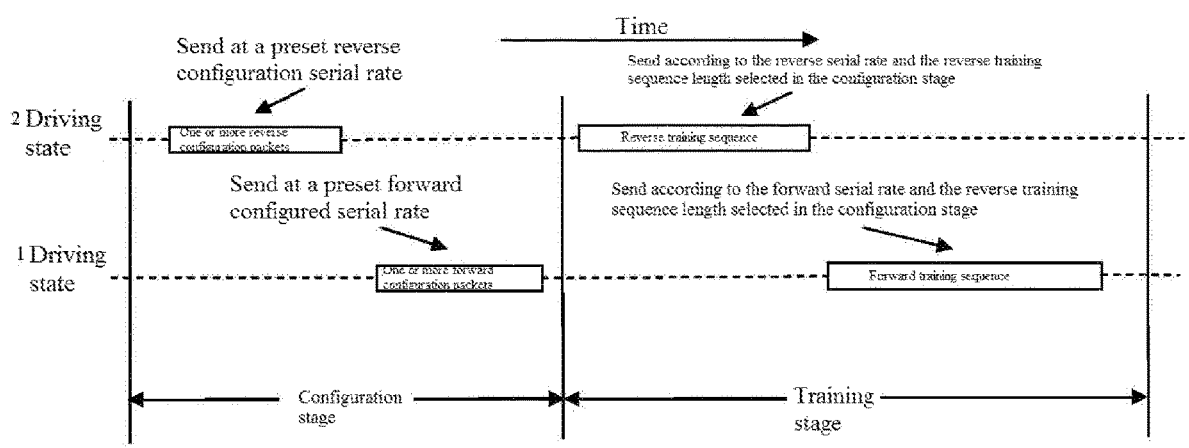
FIG. 2 is a schematic diagram of an embodiment of a link training method for a multi-rate bidirectional transmission system according to the present invention.

As shown in FIG. 2, it is a schematic diagram of an embodiment of a link training method for a multi-rate bidirectional transmission system according to the present invention. As shown in FIG. 2, in the configuration stage, the sending device 1 sends one or more forward configuration packets according to the preset forward configuration serial rate, the receiving device 2 receives the forward configuration packets according to the preset forward configuration serial rate, and the receiving device 2 sends one or more reverse configuration packets according to the preset reverse configuration serial rate, and the sending device 1 receives the reverse configuration packets according to the preset reverse configuration serial rate.

In the configuration stage, sending and receiving forward configuration packets and reverse configuration packets are carried out at preset forward configuration serial rates and reverse configuration serial rates, which are preset by the sending device 1 and the receiving device 2, so it is unnecessary to search forward or reverse serial rates, so the required time can be shortened.

In the configuration stage, the sending device 1 and the receiving device 2 communicate with each other through the forward configuration packet and select the forward serial rate, reverse serial rate, forward training sequence length and reverse training sequence length in the sending device 1 and the receiving device 2.

In the configuration stage, the sending device 1 and the receiving device 2 communicate with each other through the forward configuration packet and the reverse configuration packet, communicate the forward serial rate and the reverse serial rate supported by the sending device 1 and the receiving device 2, and select a forward serial rate and a reverse serial rate supported by both parties. The selection of the forward serial rate and the reverse serial rate by the sending device 1 and the receiving device 2 can be based on, but not limited to, the transmission bandwidth required for the forward transmission of data 101 and the transmission bandwidth required for the reverse transmission of data 202, respectively.

The preset forward configuration serial rate can be included in the forward serial rate jointly supported by the sending device 1 and the receiving device 2, or it can be unique for sending and receiving forward configuration packets in the configuration stage, and does not belong to the forward serial rate for forward equalization training and normal forward data transmission.

The preset reverse configuration serial rate can be included in the reverse serial rate jointly supported by the sending device 1 and the receiving device 2, or it can be unique for sending and receiving reverse configuration packets in the configuration stage, and does not belong to the reverse serial rate for reverse equalization training and normal reverse data transmission.

The selection of the forward training sequence length and the reverse training sequence length by the sending device 1 and the receiving device 2 can be determined according to the shortest training sequence length required by the sending device 1 and the receiving device 2 for forward and reverse equalization training, or according to other principles. The factors affecting the training sequence length include, but are not limited to, the serial rate corresponding to the forward and reverse directions, equalization operation, coding, etc.

Figure 3:
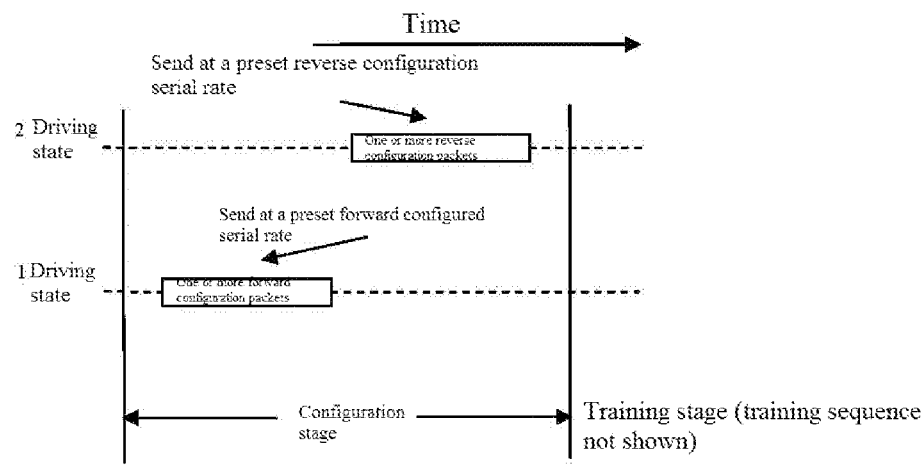
FIG. 3 is a schematic diagram of embodiment 2 of the multi-rate bidirectional transmission system configuration stage of the present invention.

The sending device 1 and the receiving device 2 communicate in two directions through the forward configuration packet and the reverse configuration packet. The present invention does not limit the sending order of the forward configuration packet and the reverse configuration packet. In FIG. 2, the reverse configuration packet is sent before the forward configuration packet. FIG. 3 is a schematic diagram of embodiment 2 of the configuration stage shown in FIG. 2. In FIG. 3, packets are configured in the reverse direction and then transmitted in the forward direction.

Figure 4:
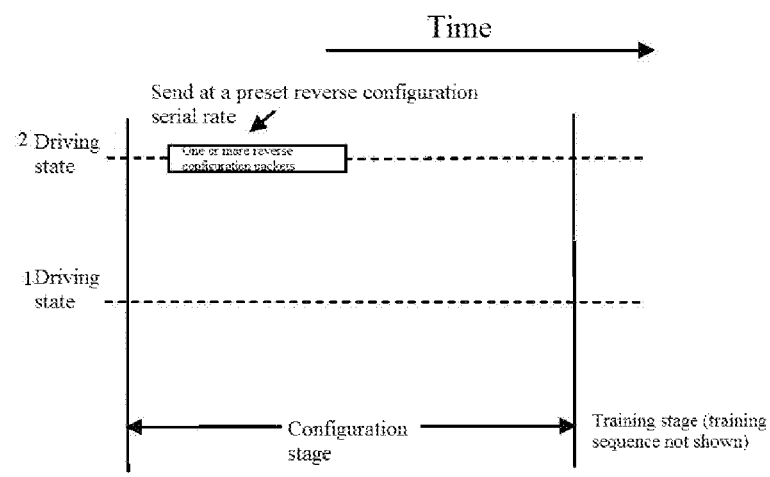
FIG. 4 is a schematic diagram of embodiment 3 of the multi-rate bidirectional transmission system configuration stage of the present invention.

If the forward serial rate and the reverse serial rate supported by one of the sending device 1 or the receiving device 2 are known by the other, the configuration packet in only one direction may be sent, that is, only the forward configuration packet or the reverse configuration packet may be sent. FIG. 4 is a schematic diagram of embodiment 3 of the configuration stage shown in FIG. 2. In FIG. 4, only the reverse configuration packet is sent without sending the forward configuration packet. In this case, the receiving device 2 selects the forward serial rate, the reverse serial rate, the forward training sequence length and the reverse training sequence length and sends them to the sending device 1 through the reverse configuration packets.

Figure 5:
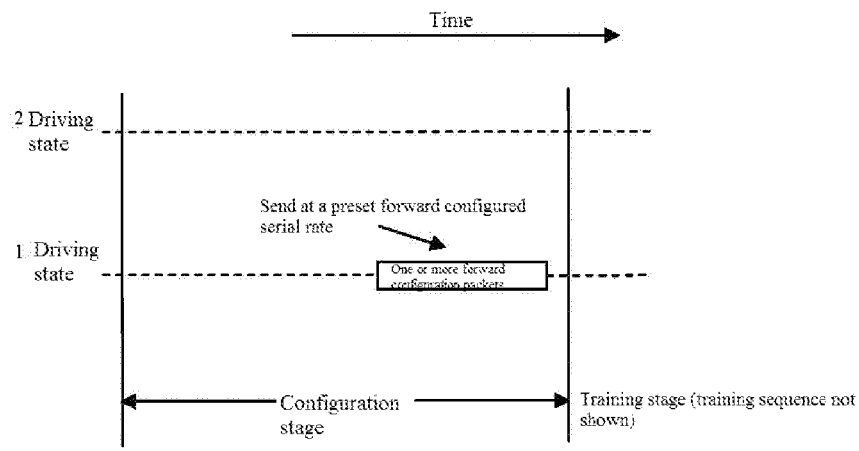
FIG. 5 is a schematic diagram of embodiment 4 of the multi-rate bidirectional transmission system configuration stage of the present invention.

FIG. 5 is a schematic diagram of embodiment 4 of the configuration stage shown in FIG. 2. In FIG. 5, only the forward configuration packet is sent without sending the reverse configuration packet. In this case, the sending device 1 selects a forward serial rate, a reverse serial rate, a forward training sequence length and a reverse training sequence length and transmits them to the receiving device 2 through a forward configuration packet.

FIG. 2, FIG. 3, FIG. 4 and FIG. 5 only show four ways of communication and selection of forward serial rate, reverse serial rate, forward training sequence length and reverse training sequence length between the sending device 1 and the receiving device 2. The sending device 1 and the receiving device 2 can also use other ways to realize communication and selection of forward serial rate, reverse serial rate, forward training sequence length and reverse training sequence length between the sending device 1 and the receiving device 2.

Although the multi-rate bidirectional transmission system of the present invention supports the simultaneous transmission of forward serial data and reverse serial data on the cable 3, equalization training has not been carried out in the configuration stage. In order to improve the transmission reliability in the configuration stage, forward configuration packets and reverse configuration packets are transmitted on the cable 3 in a time-division manner, so that data in one direction is not interfered by data in the other direction, thereby improving the transmission reliability of forward configuration packets and reverse configuration packets in the configuration stage.

In order to further improve the transmission reliability in the configuration stage, the sending device 1 can send a plurality of forward configuration packets, and the receiving device 2 can send a plurality of reverse configuration packets. The forward configuration packet and the reverse configuration packet can also have error correction or error detection codes. The receiving device 2 can obtain the information contained therein as long as it correctly receives one of the forward configuration packets, and the sending device 1 can obtain the information contained therein as long as it correctly receives one of the reverse configuration packets.

In the training stage, the sending device 1 transmits the forward training sequence according to the forward serial rate and the forward training sequence length selected in the configuration stage, and the receiving device 2 receives the forward training sequence according to the forward serial rate and the forward training sequence length selected in the configuration stage and performs forward equalization training.

In the training stage, the receiving device 2 sends the reverse training sequence according to the reverse serial rate and reverse training sequence length selected in the configuration stage, and the sending device 1 receives the reverse training sequence according to the reverse serial rate and reverse training sequence length selected in the configuration stage and performs reverse equalization training.

In the training stage as shown in FIG. 2, the reverse training sequence is sent first and then the forward training sequence is sent and the forward equalization training is performed. The reverse training sequence and the forward training sequence are transmitted in time-division on the cable 3.

Figure 6:
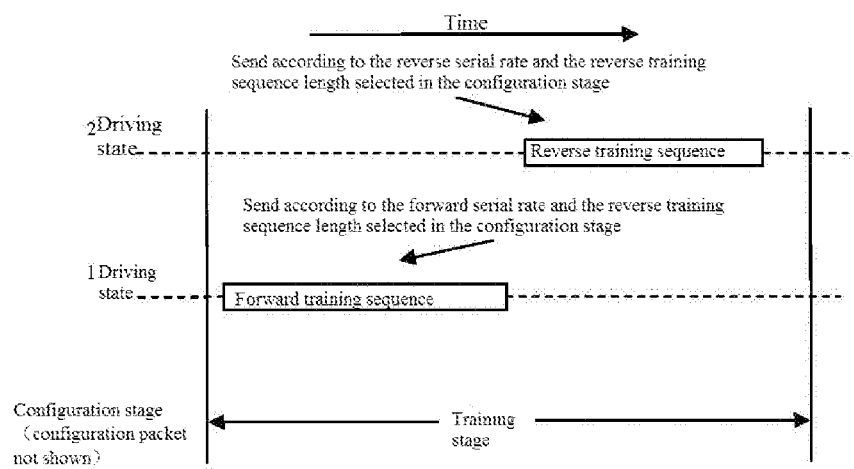
FIG. 6 is a schematic diagram of the second embodiment of the training stage of the multi-rate bidirectional transmission system of the present invention.

FIG. 6 is a schematic diagram of embodiment 2 of the training stage shown in FIG. 2. In FIG. 6, a forward training sequence is sent and a forward equalization training is performed, and then a reverse training sequence is sent and a reverse equalization training is performed.

Figure 7:
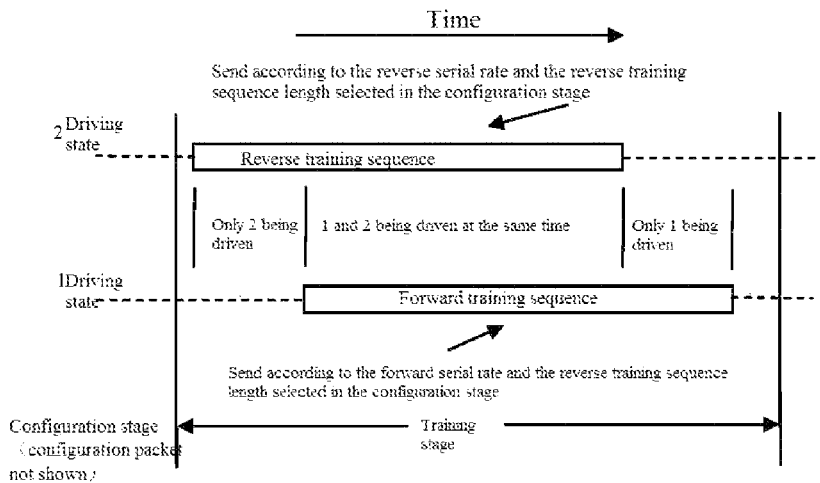
FIG. 7 is a schematic diagram of embodiment 3 of the multi-rate bidirectional transmission system in the training stage of the present invention.

FIG. 7 is a schematic diagram of the third embodiment of the training stage shown in FIG. 2. In FIG. 7, the time for sending the forward training sequence and the reverse training sequence can overlap, that is, the forward training sequence and the reverse training sequence are sent on the cable 3 at the same time.

The sending device 1 can choose to perform reverse equalization training when the sending device 1 and the receiving device 2 are driven at the same time. At this time, the training result includes the influence of forward serial data on receiving the reverse training sequence, which is better in line with the actual working situation of transmitting forward serial data and reverse serial data at the same time in normal work after the training stage.

The receiving device 2 can choose to carry out forward equalization training when the sending device 1 and the receiving device 2 are driven at the same time. At this time, the training result includes the influence of reverse serial data on receiving the forward training sequence, which is better in line with the actual working situation of transmitting forward serial data and reverse serial data at the same time in normal work after the training stage.

Figure 8:
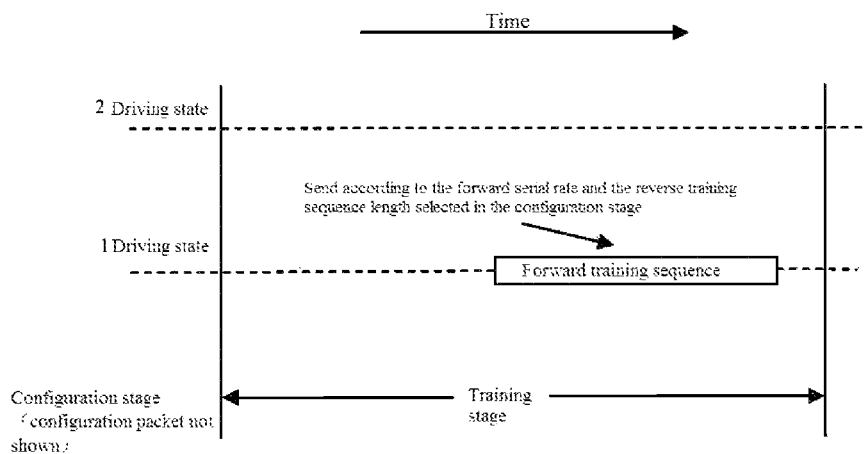
FIG. 8 is a schematic diagram of embodiment 4 of the training stage of the multi-rate bidirectional transmission system of the present invention.

FIG. 8 is a schematic diagram of the training stage embodiment 4 shown in FIG. 2. In FIG. 8, only the forward training sequence is sent and the forward equalization training is performed, but the reverse training sequence is not sent and the reverse equalization training is performed. The sending device 1 may not include the reverse equalization module 13, and the schematic diagram shown in FIG. 8 can be applied to the case where the sending device 1 does not include the reverse equalization module 13.

Both the sending device 1 and the receiving device 2 can only support the same reverse serial rate, which usually happens when the transmission bandwidth required for reverse transmission of data 202 is low and one reverse serial rate can meet all requirements, that is, the reverse serial rate can be a fixed rate, so it is unnecessary to communicate and select the reverse serial rate between the sending device 1 and the receiving device 2.

When the reverse serial rate is low, the attenuation of the reverse serial signal is small, and the sending device 1 may not include the reverse equalization module 13, or although the sending device 1 includes the reverse equalization module 13, the reverse equalization module 13 may be configured according to preset parameters and coefficients. At this time, the reverse training sequence may not be transmitted and the reverse equalization training may be performed in the training stage, so it is not necessary to communicate and select the reverse training sequence length between the sending device 1 and the receiving device 2.

The present invention provides a multi-rate bidirectional transmission system and a link training method thereof. The present invention can send forward serial data and reverse serial data on a cable at the same time. The multi-rate bidirectional transmission system selects a forward serial rate meeting the requirements of forward transmission bandwidth from one or more supported forward serial rates, and the multi-rate bidirectional transmission system selects a reverse serial rate meeting the requirements of reverse transmission bandwidth to transmit reverse serial data. The link training method provided by the present invention consists of a configuration stage and a training stage. In the configuration stage, a sending device and a receiving device send forward configuration packets and reverse configuration packets in a time-division manner according to preset forward and reverse rates, and communicate and select forward and reverse serial rates and forward and reverse training sequence lengths between the sending device and the receiving device. In the training stage, the sending device and the receiving device send forward and reverse training sequences according to the selected forward and reverse serial rates and forward and reverse training sequence lengths and perform forward and reverse equalization training. By communicating and selecting the forward and reverse serial rates in the configuration stage, the present invention avoids searching the forward and reverse serial rates in the training stage, which can simplify the design and improve the link training speed. At the same time, in the configuration stage, it can communicate and select the forward and reverse training sequence lengths needed for equalization operation in concrete implementation, which can avoid presetting the forward and reverse training sequence lengths in the worst case, thus further improving the link training speed.

The above is only the preferred embodiment of the present invention, and it does not limit the present invention in any form. The scope of protection requested by the present invention shall be subject to the contents recorded in the claims. All simple changes, equivalent substitutions or decomposition and merger of the above specific embodiments according to the technical essence of the present invention still fall within the scope of protection requested by the technical solution of the present invention.

What is claimed is:

1. A multi-rate bidirectional transmission system, comprising a sending device, a receiving device and a cable, wherein the sending device is connected with the receiving device through the cable, wherein,
    the sending device sends forward serial data to the cable, the receiving device sends reverse serial data to the cable, and the forward serial data and reverse serial data are simultaneously transmitted on the cable,
    the sending device supports one or more forward serial rates, the receiving device supports one or more forward serial rates, and at least one of the sending device and the receiving device supports multiple forward serial rates,
    the sending device receives and separates the reverse serial data from the cable, and performs clock and data recovery and deserialization operations,
    the receiving device receives and separates the forward serial data from the cable, and performs a forward equalization operation, clock and data recovery and deserialization operations; the multi-rate bidirectional transmission system uses a link training method to select a forward serial rate from one or more forward serial rates jointly supported by the sending device and the receiving device, and selects a forward training sequence length to carry out a forward equalization training,
    the link training method comprises two stages, namely, a configuration stage and a training stage,
    in the configuration stage, the sending device sends one or more forward configuration packets according to a preset forward configuration serial rate, the receiving device receives the forward configuration packets according to the preset forward configuration serial rate; the receiving device sends one or more reverse configuration packets according to a preset reverse configuration serial rate, and the sending device receives the reverse configuration packets according to the preset reverse configuration serial rate; the sending device and the receiving device communicate the forward serial rate jointly supported by both parties through the forward configuration packets and the reverse configuration packets and select a forward serial rate from one or more forward serial rates jointly supported, and the sending device and the receiving device select the forward training sequence length,
    in the training stage, the sending device sends a forward training sequence according to the forward serial rate and the forward training sequence length selected in the configuration stage, and the receiving device receives the forward training sequence according to the forward serial rate and the forward training sequence length selected in the configuration stage and carries out a forward equalization training, wherein the forward equalization training is to adjust a forward equalization coefficient of the forward equalization operation according to the received forward training sequence, thereby improving the quality of a forward serial signal after the forward equalization operation.

2. The multi-rate bidirectional transmission system according to claim 1, wherein,
    the reverse serial rate is lower than the forward serial rate.

3. The multi-rate bidirectional transmission system according to claim 1, wherein,
    the forward configuration packets and the reverse configuration packets are transmitted on the cable in a time-division manner.

4. The multi-rate bidirectional transmission system according to claim 1, wherein,
    the forward configuration packets and the reverse configuration packets also have error correction or error detection codes.

5. The multi-rate bidirectional transmission system according to claim 1, wherein,
    the receiving device supports one or more reverse serial rates, and the sending device supports one or more reverse serial rates; in the configuration stage of the link training method, the sending device and the receiving device also communicate the reverse serial rates supported by both parties through forward configuration packets and reverse configuration packets, and select a reverse serial rate from the one or more reverse serial rates jointly supported.

6. The multi-rate bidirectional transmission system according to claim 1, wherein, the sending device receives and separates the reverse serial data from the cable, performs clock and data recovery and deserialization operations, and performs a reverse equalization operation; in the configuration stage of the link training method, the sending device and the receiving device also select a reverse training sequence length through the forward configuration packets and the reverse configuration packets, and perform a reverse equalization training in the training stage of the link training method, in the training stage, the receiving device sends a reverse training sequence according to the reverse training sequence length selected in the configuration stage, and the sending device receives the reverse training sequence according to the reverse training sequence length selected in the configuration stage and carries out the reverse equalization training; the reverse equalization training is to adjust a reverse equalization coefficient of the reverse equalization operation according to the received reverse training sequence, thereby improving the quality of a reverse serial signal after the reverse equalization operation.

* * * * *